United States Patent
Boyd et al.

(10) Patent No.: US 7,212,563 B2
(45) Date of Patent: May 1, 2007

(54) REAL-TIME LOCATING SYSTEM AND METHOD USING TIMING SIGNAL

(75) Inventors: Robert W. Boyd, Rogersville, TN (US); Donald K. Belcher, Rogersville, TN (US); Michael A. Wohl, Rogersville, TN (US); David S. Wisherd, Sunnyvale, CA (US)

(73) Assignee: Wherenet Corp, Santa Clara, CA (US)

( * ) Notice: Subject to any disclaimer, the term of this patent is extended or adjusted under 35 U.S.C. 154(b) by 893 days.

(21) Appl. No.: 10/138,795

(22) Filed: May 3, 2002

(65) Prior Publication Data

US 2002/0181565 A1    Dec. 5, 2002

Related U.S. Application Data

(60) Provisional application No. 60/288,772, filed on May 4, 2001.

(51) Int. Cl.
 *H04B 1/00* (2006.01)
(52) U.S. Cl. .................. 375/130; 340/825.54; 340/450
(58) Field of Classification Search ............. 340/572.1, 340/10, 825.49, 539.13; 342/450, 126; 455/343.2, 456.1; 375/130; 235/335
See application file for complete search history.

(56) References Cited

U.S. PATENT DOCUMENTS

| | | | | |
|---|---|---|---|---|
| 4,220,923 A | | 9/1980 | Pelchat et al. ............... 455/295 |
| 4,608,569 A | | 8/1986 | Dickey, Jr. et al. .......... 343/384 |
| 4,931,977 A | | 6/1990 | Klemes ........................ 364/581 |
| 5,331,602 A | * | 7/1994 | McLaren ........................ 367/6 |
| 5,393,965 A | | 2/1995 | Bravman et al. ............ 235/383 |
| 5,418,812 A | | 5/1995 | Reyes et al. ..................... 375/1 |
| 5,493,307 A | | 2/1996 | Tsujimoto .................... 342/380 |
| 5,528,621 A | | 6/1996 | Heiman et al. ............. 375/200 |
| 5,534,867 A | * | 7/1996 | Rose ............................. 342/17 |
| 5,536,930 A | | 7/1996 | Barkan et al. ............... 235/472 |
| 5,646,389 A | | 7/1997 | Bravman et al. ............ 235/385 |
| 5,768,140 A | | 6/1998 | Swartz et al. ........... 364/478.13 |
| 5,768,531 A | | 6/1998 | Lin ........................ 395/200.72 |
| 5,802,101 A | | 9/1998 | Maruyama ................... 375/206 |
| 5,812,589 A | | 9/1998 | Sealander et al. ........... 375/200 |
| 5,818,517 A | | 10/1998 | Hudson et al. ............... 348/21 |
| 5,850,187 A | * | 12/1998 | Carrender et al. .......... 340/10.6 |
| 5,920,287 A | * | 7/1999 | Belcher et al. .............. 342/450 |

(Continued)

FOREIGN PATENT DOCUMENTS

EP    1 050 793 A2    11/2000

(Continued)

*Primary Examiner*—Chieh M. Fan
*Assistant Examiner*—Nader Bolourchi
(74) *Attorney, Agent, or Firm*—Allen, Dyer, Doppelt, Milbrath & Gilchrist, P.A.

(57) ABSTRACT

A location system includes a plurality of signal readers for receiving signals from a wireless transmitter to be located. The signals include a wideband, spread spectrum signal and a timing marker appended a predetermined time in front of the wideband, spread spectrum signal for indicating the presence of the wideband, spread spectrum signal. A location processor is operatively coupled to the signal readers for detecting the timing markers of signals and responsive to a detection of a timing marker, correlating a signal as a first-to-arrive signal and conducting differentiation of first-to-arrive signals to locate a wireless transmitter.

10 Claims, 3 Drawing Sheets

U.S. PATENT DOCUMENTS

| | | | |
|---|---|---|---|
| 5,923,702 A | 7/1999 | Brenner et al. | 375/202 |
| 5,945,944 A * | 8/1999 | Krasner | 342/357.06 |
| 5,995,046 A | 11/1999 | Belcher et al. | 342/450 |
| 6,031,863 A | 2/2000 | Jusa et al. | 375/202 |
| 6,121,926 A | 9/2000 | Belcher et al. | 342/450 |
| 6,127,976 A | 10/2000 | Boyd et al. | 342/463 |
| 6,128,549 A | 10/2000 | Swartz et al. | 700/225 |
| 6,236,365 B1 | 5/2001 | LeBlanc et al. | 342/457 |
| 6,268,723 B1 | 7/2001 | Hash et al. | 324/243 |
| 6,868,073 B1 * | 3/2005 | Carrender | 370/278 |

FOREIGN PATENT DOCUMENTS

| | | |
|---|---|---|
| WO | 99/37047 | 7/1999 |

\* cited by examiner

REAL-TIME LOCATING SYSTEM AND METHOD USING TIMING SIGNAL

RELATED APPLICATION

This application is based upon prior filed copending provisional application Ser. No. 60/288,772 filed May 4, 2001.

FIELD OF THE INVENTION

This invention relates to real-time location systems, and more particularly, this invention relates to real-time location systems using a plurality of signal readers and differentiation of first-to-arrive signals to locate a transmitter.

BACKGROUND OF THE INVENTION

In commonly assigned U.S. Pat. Nos. 5,920,287; 5,995,046; 6,121,926; and 6,127,976, the disclosures which are hereby incorporated by reference in their entirety, a real time location system is disclosed using a plurality of tag emission (signal) readers that are disbursed throughout a monitored environment, such as a manufacturing environment. The tag signal readers are operative with a location processor to determine which tag signals transmitted from tag transmitters are first-to-arrive signals. The location processor conducts differentiation of the first-to-arrive signals to locate a tag within the monitored environment.

These location and tracking systems provide asset management that not only addresses the need to locate and track different components in the course of their travel through a manufacturing and assembly sequence, but also addresses the more general problem concerning component and equipment inventory control and allow control concerning the whereabouts of any and all assets of a business, factory, educational, military, or recreational facility. In some systems, status information can be provided to a tag transmitter by means of sensors associated with the tag. Typically, the tag signal readers are placed at known locations throughout the environment having the objects to be located or tracked. The system uses time-of-arrival differentiation of repetitive spread spectrum, short duration pulse "blinks" from object-attached tags. The system provides the practical, continuous identification of the location of each and every object within the environment of interest, irrespective of whether the object is stationary or moving.

This type of system requires a periodic or semi-periodic wideband transmission and/or radar-like pinging to "lock" a receiver loop in a proper window sampling. This implies a reduction in capacity and increases the hardware expense and power consumption and eliminates the use of asynchronous low power tag transmitters, i.e., tag transmitters that can transmit only once.

SUMMARY OF THE INVENTION

The present invention advantageously provides an asynchronous acquisition method and system for wideband pulsed transmissions used for increasing accuracy of the afore-mentioned real-time location systems as described above. In accordance with the present invention, the location system includes a plurality of signal readers for receiving signals from a wireless transmitter to be located. A signal as transmitted comprises a wideband, spread spectrum signal and a timing marker appended a predetermined time in front of the wideband, spread spectrum signal for indicating the presence of the wideband, spread spectrum signal. A location processor is operatively coupled to the signal readers for detecting the timing markers of signals and responsive to a detection of a timing mark, correlating a signal as a first-to-arrive signal and conducting differentiation of first-to-arrive signals to locate a wireless transmitter.

In one aspect of the present invention, the timing marker is timed about 80 to about 120 nanoseconds in front of the wideband, spread spectrum signal, which corresponds, in one non-limiting example, to about 100 feet of propagation distance. This timing marker could comprise a wireless, local area network transmission and an access point base station could be operative with the location processor and at least one signal reader in a wireless local area network.

In yet another aspect of the present invention, the location processor comprises a matched filter correlator. The matched filter correlator further comprises matched filter banks having parallel correlators that correlate and receive communication signals with time offset versions of a reference spreading code. The location processor could also include a plurality of processors for distributing processing capability. At least three signal readers are preferably used for determining the location of a wireless transmitter. Mutually diverse antennas can be used for detecting signals at each signal reader.

In yet another aspect of the present invention, each wireless transmitter comprises a tag transmitter that is coupled with an object to be located. The wideband, spread spectrum signal includes identification data regarding the object to which the tag transmitter is coupled.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Figure 1:
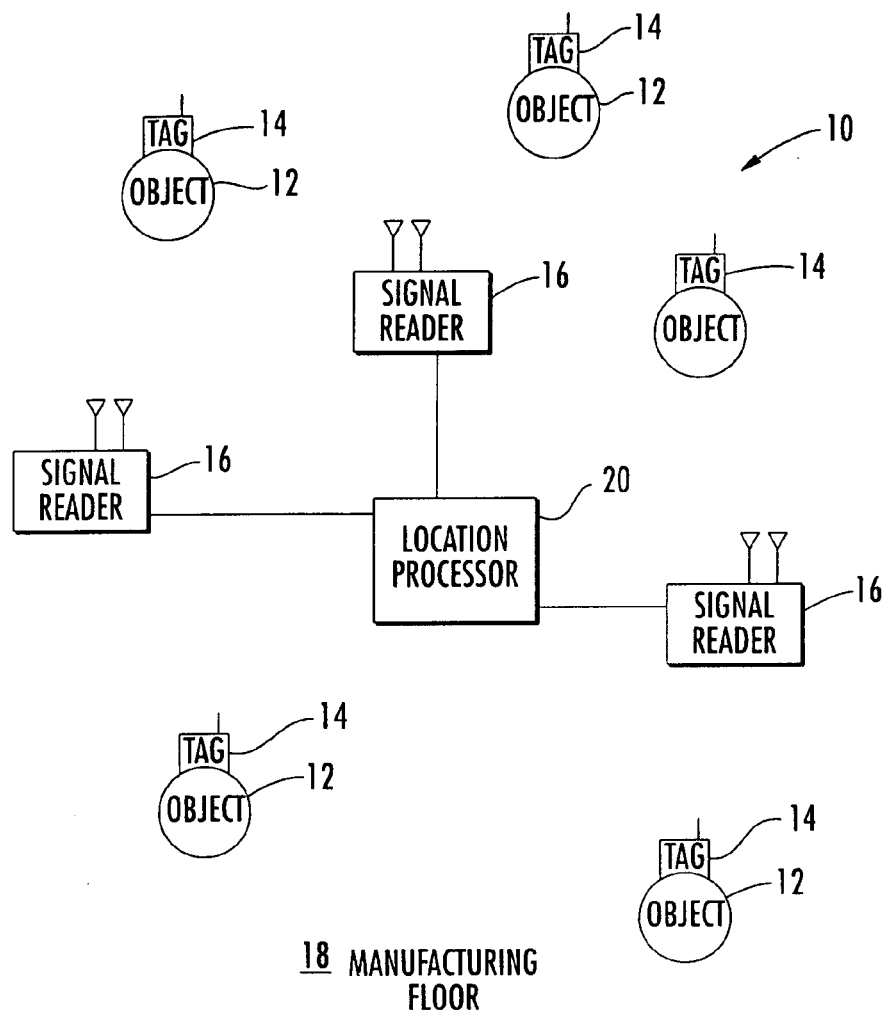
FIG. 1 is a block diagram of the system of the present invention showing different transmitters as tags associated with objects to be located, a plurality of signal readers, and a location processor.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously allows an asynchronous acquisition for wideband pulsed transmissions to increase the accuracy of a real-time location system. A signal can be easily and asynchronously acquired and demodulated without a priori information and is appended prior to the transmission of a wideband signal used for high resolution location determination, such as the type of location systems described in the above-identified and incorporated by reference patents. This timing signal allows implementation of a multiple reader infrastructure that can receive a low power tag transmission signal as asynchronously transmitted wideband pulse signals. The "preamble" or "timing signal" is a timing marker that could be either an 802.11 wireless local area network (WLAN) transmission and/or a direct sequence spread spectrum (DSSS) real-time location tag signal as transmitted from a wireless tag transmitter, such as the type that is coupled with an object to be located as described in the incorporated by reference patents. In either case, the 802.11 or real-time location system timing marker as a header will precede the wideband transmission portion of the signal having the asset or object identification data and other information. The receivers forming the infrastructure as signal readers and location processor will acquire the header or timing marker as they do normally as an asynchronous process and establish a small, known period of time such that the wideband pulse can be found. The complexity of the receiving equipment for the wideband signal can be substantially reduced because a sampling window for edge detection as a range gate (as in radar) is determined by timing of the header or timing marker.

Alternatively, the wideband system can use time invariant signal processing to allow unexpected signals to be received and stamped with time-of-arrival having indications from independent receivers to achieve the required degree of synchronism by either providing a system clock to all receivers (asynchronous receiving system) or by receiving signals intended specifically to allow determination of receiver clock differences, e.g., transmissions from a known location. In either case, the transmitter does not have to have timing information, i.e., it operates autonomously and asynchronously, and greatly simplifies the complexity of the transmitting device. Another variant of this invention is to have a wideband transmission triggered by a single device, both a transmitter and a receiver, but received simultaneously by a multiplicity of receivers.

As shown in one non-limiting example of FIG. 1, a location system 10 includes a number of objects 12 having wireless tag transmitters 14 associated therewith. A number of signal readers 16 are contained within the monitored environment 18 and act as tag signal readers for receiving signals from the wireless tag transmitters 14.

Figure 2:
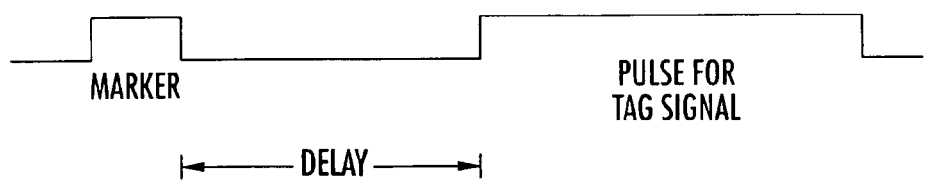
FIG. 2 is a block diagram of a wireless signal transmitted from a transmitter to the signal readers and showing a timing marker and the wideband signal portion following the timing marker.

In one aspect of the present invention, the tag signal readers 16 could be associated with an access point base station of a wireless local area network transmission. The signals transmitted by the wireless tag transmitters 14 are wideband, spread spectrum signals and a timing marker is appended a predetermined time in front of the wideband, spread spectrum signal for indicating the presence of the wideband, spread spectrum signal. A location processor 20 is operatively coupled to the tag signal readers such as by a wireless communication system or a wired connection, for detecting the timing markers of signals, and being responsive to a detection of a timing marker, correlating a signal as a first-to-arrive signal and conducting differentiation of first-to-arrive signals to locate a wireless transmitter. The timing marker is timed about 80 to about 120 nanoseconds in front of the wideband, spread spectrum signal as shown in FIG. 2.

Much of the technology and detection capability as associated with the system and method of the present invention can use circuitry and algorithms described in the commonly assigned U.S. Pat. Nos. 5,920,287; 5,995,046; 6,121,926; and 6,127,976. The circuitry described in these patents can be modified for use with the timing markers of the present invention as suggested by those skilled in the art. Also, improvements to the aforementioned systems disclosed in the above-identified and incorporated by reference patents can also be used and are found in commonly assigned U.S. patent application Ser. Nos. 10/038,532; 09/997,282; 10/033,529; and 10/023,481, the disclosures which are hereby incorporated by reference in their entirety.

Although operation of tag transmitters can vary depending on the type of circuitry chosen by those skilled in the art, in one aspect of the invention, a tag transmitter transmits wideband (spread spectrum) pulse of radio frequency energy that is encoded with information, such as that representative of the identification of the object, and other object-associated information stored in a memory. The timing marker precedes the pulse as a preamble as shown in FIG. 2.

Each tag transmitter can have a unique internal identification number that is transmitted via radio frequency and could also be read with a bar code scanner, if necessary. This could allow seamless integration of a bar code system with a location system. The tag transmitter could include a memory having a read/write memory that acts as a portable data file to carry data between various environments and provide a field accessible, distributed database. The frequency range can vary, but as one non-limiting example, it could be about 2.4 to about 2.483 GHz. The typical read range can range from about 350 feet to greater than 1,000 feet in some instances, and even greater depending on the type of system and transmitter.

As to the tag signal readers, they include an active receiver and antenna array in some examples that capture spread spectrum radio signals from the tag transmitters. They are typically installed in a grid pattern to provide complete coverage to a site. They can be mounted from as little as 250 feet apart to as much as 750 feet apart and even greater distances.

Although mutually diverse antenna are illustrated, it is also possible that an omnidirectional, circularly polarized antenna could be used as noted in some of the aforementioned and incorporated by reference patents. This would allow a tag signal reader to receive signals from any direction and provide hemispherical coverage within an environment to maximize response to the horizon and diminish response by several decibels to signals arriving from a vertical (downward) direction, which could be advantageous in some cases. The use of mutually diverse antennas, on the other hand, obviates some multipath based fades and nulls. It is also possible to incorporate configuration and/or sensitivity diversity into the antennas, such as by using orthogonally polarized antennas.

In the present invention, the simultaneous processing of tag signal receptions from multiple antennas at different locations also allows the system architecture, as shown in FIG. 1, to obtain significant cost reduction for some applications.

Figure 3:
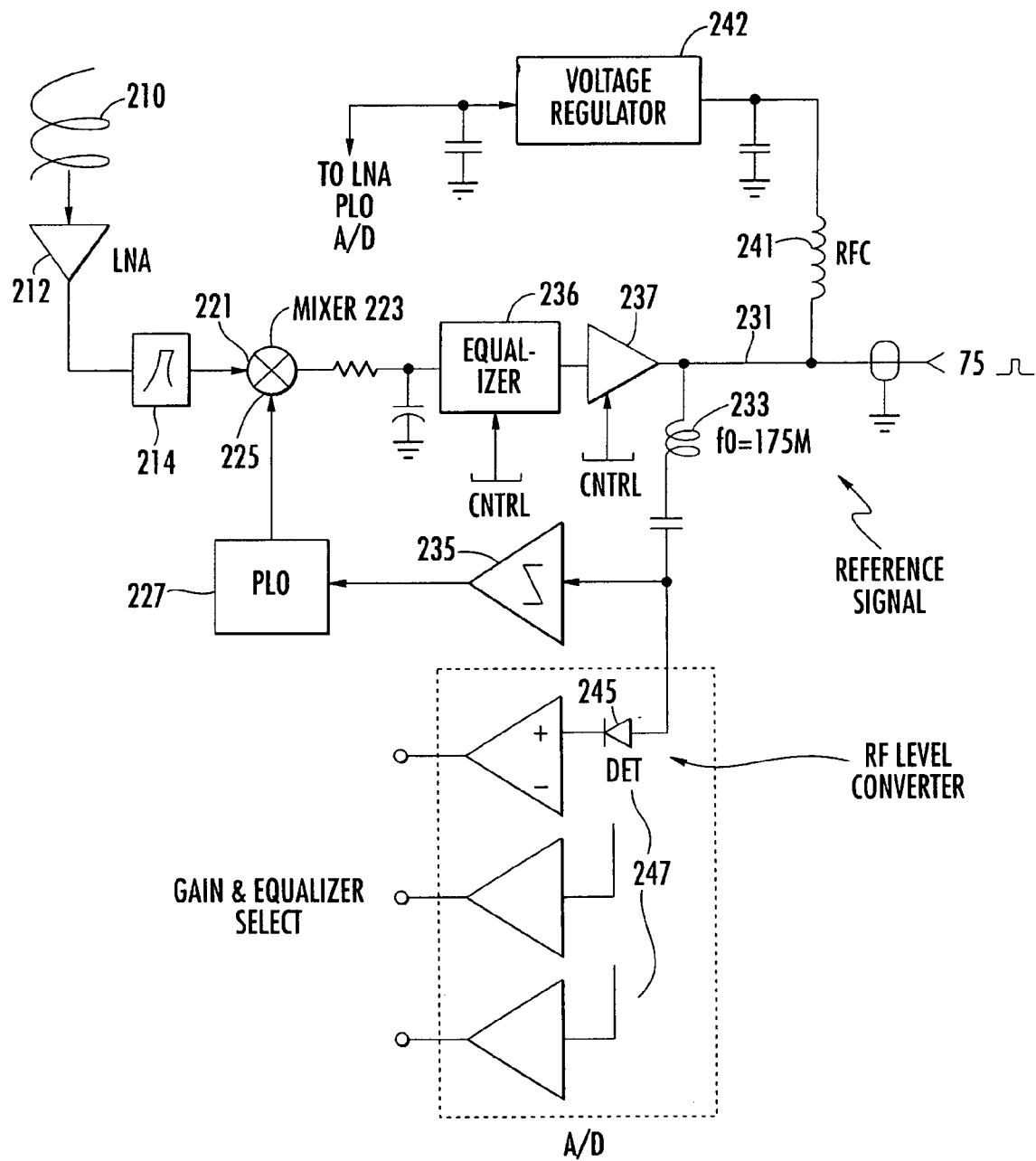
FIG. 3 is a high level block diagram of one example of circuit architecture that can be used for a signal reader in accordance with the present invention.
Figure 4:
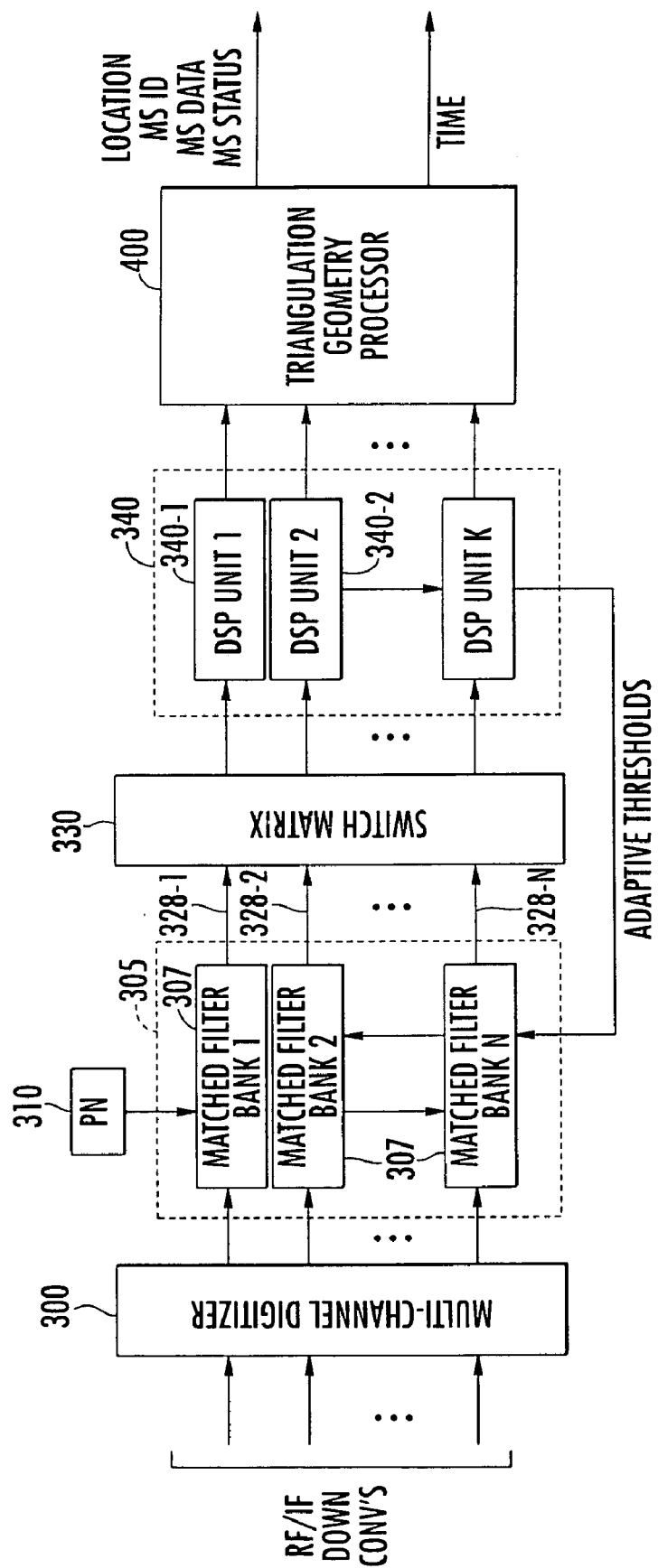
FIG. 4 is another high level block diagram of one example of circuit architecture that can be used for a correlation-based, RF signal location processor in accordance with the present invention.

FIGS. 3 and 4 represent examples of the type of circuits that can be used with modifications as suggested by those skilled in the art for tag signal reader circuitry and location processor circuitry to determine the timing marker, set up the correlation algorithm responsive to the timing marker, and determine which tag signals are first-to-arrive signals and conduct differentiation of first-to-arrive signals to locate a tag or other transmitter generating a tag or comparable signal. Other details of representative circuits that could be used with various modifications suggested by those skilled in the art are shown in the above-identified and incorporated by reference patents.

Referring now to FIGS. 3 and 4, a representative circuit and algorithm as described in the above mentioned and incorporated by reference patents are disclosed and set forth in the description below to aid in understanding the type of tag signal reader and location processor circuitry that can be used for determining which signals are first-to-arrive signals and how the processor conducts differentiation of the first-to-arrive signals to locate a tag transmitter.

FIG. 3 diagrammatically illustrates one type of circuitry configuration of a respective architecture for "reading" associated signals or a pulse (a "blink") used for location determination signals, such as signals emitted from a tag transmitter to the tag signal readers. This circuit can be associated with the tag signal reader of the present invention. An antenna 210 senses appended transmission bursts or other signals from the object and tag transmitter to be located. The antenna in this aspect of the invention could be omnidirectional and circularly polarized, as noted before, and coupled to a power amplifier 212, whose output is filtered by a bandpass filter 214. Naturally, dual diversity antennae could be used as noted in some of the incorporated by reference patents or a single antenna, as also noted in some of the patents. Respective I and Q channels of the bandpass filtered signal are processed in associated circuits corresponding to that coupled downstream of filter 214. To simplify the drawing only a single channel is shown.

A respective bandpass filtered I/Q channel is applied to a first input 221 of a down-converting mixer 223. Mixer 223 has a second input 225 coupled to receive the output of a phase-locked local IF oscillator 227. IF oscillator 227 is driven by a highly stable reference frequency signal (e.g., 175 MHz) coupled over a (75 ohm) communication cable 231 from a control processor. The reference frequency applied to phase-locked oscillator 227 is coupled through an LC filter 233 and limited via limiter 235.

The IF output of mixer 223, which may be on the order of 70 MHz, is coupled to a controlled equalizer 236, the output of which is applied through a controlled current amplifier 237 and preferably applied to communication cable 231 through a communication signal processor, which could be an associated processor as described before. The communication cable 231 also supplies DC power for the various components of the tag signal reader by way of an RF choke 241 to a voltage regulator 242, which supplies the requisite DC voltage for powering an oscillator, power amplifier and analog-to-digital units of the receiver.

A 175 MHz reference frequency can be supplied by a communications control processor to the phase locked local oscillator 227 and its amplitude could imply the length of any communication cable 231 (if used). This magnitude information can be used as control inputs to equalizer 236 and current amplifier 237, so as to set gain and/or a desired value of equalization, that may be required to accommodate any length of any communication cables (if used). For this purpose, the magnitude of the reference frequency may be detected by a simple diode detector 245 and applied to respective inputs of a set of gain and equalization comparators shown at 247. The outputs of comparators are quantized to set the gain and/or equalization parameters.

It is possible that sometimes signals could be generated through the clocks used with the global positioning system receivers and/or other wireless signals. Such timing reference signals can be used as suggested by known skilled in the art.

FIG. 4 diagrammatically illustrates the architecture of a correlation-based, RF signal processor circuit as part of a location processor to which the output of a respective RF/IF conversion circuit of FIG. 3 can be coupled such as by wireless communication (or wired in some instances) for processing the output and determining location based on the GPS receiver location information for various tag signal readers. The correlation-based RF signal processor correlates spread spectrum signals detected by an associated tag signal reader with successively delayed or offset in time (by a fraction of a chip) spread spectrum reference signal patterns, and determines which spread spectrum signal is the first-to-arrive corresponding to a location pulse.

Because each tag signal reader can be expected to receive multiple signals from the tag transmitter due to multipath effects caused by the signal transmitted by the tag transmitter being reflected off various objects/surfaces, the correlation scheme ensures identification of the first observable transmission, which is the only signal containing valid timing information from which a true determination can be made of the distance.

For this purpose, as shown in FIG. 4, the RF processor employs a front end, multichannel digitizer 300, such as a quadrature IF-baseband down-converter for each of an N number of receivers. The quadrature baseband signals are digitized by associated analog-to-digital converters (ADCs) 272I and 272Q. Digitizing (sampling) the outputs at baseband serves to minimize the sampling rate required for an individual channel, while also allowing a matched filter section 305, to which the respective channels (reader outputs) of the digitizer 300 are coupled to be implemented as a single, dedicated functionality ASIC, that is readily cascadable with other identical components to maximize performance and minimize cost.

This provides an advantage over bandpass filtering schemes, which require either higher sampling rates or more expensive analog-to-digital converters that are capable of directly sampling very high IF frequencies and large bandwidths. Implementing a bandpass filtering approach typically requires a second ASIC to provide an interface between the analog-to-digital converters and the correlators. In addition, baseband sampling requires only half the sampling rate per channel of bandpass filtering schemes.

The matched filter section 305 may contain a plurality of matched filter banks 307, each of which is comprised of a set of parallel correlators, such as described in the above identified, incorporated by reference '926 patent. A PN spreading code generator could produce a PN spreading code (identical to that produced by a PN spreading sequence generator of a tag transmitter). The PN spreading code produced by PN code generator is supplied to a first correlator unit and a series of delay units, outputs of which are coupled to respective ones of the remaining correlators. Each delay unit provides a delay equivalent to one-half a chip. Further details of the parallel correlation are found in the incorporated by reference '926 patent.

As a non-limiting example, the matched filter correlators may be sized and clocked to provide on the order of $4 \times 10^6$ correlations per epoch. By continuously correlating all possible phases of the PN spreading code with an incoming signal, the correlation processing architecture effectively functions as a matched filter, continuously looking for a match between the reference spreading code sequence and the contents of the incoming signal. Each correlation output port 328 is compared with a prescribed threshold that is adaptively established by a set of "on-demand" or "as needed" digital processing units 340-1, 340-2, . . . 340-K. One of the correlator outputs 328 has a summation value exceeding the threshold in which the delayed version of the PN spreading sequence is effectively aligned (to within half a chip time) with the incoming signal.

This signal is applied to a switching matrix 330, which is operative to couple a "snapshot" of the data on the selected channel to a selected digital signal processing unit 340-1 of the set of digital signal processing units 340. The units can "blink" or transmit location pulses randomly, and can be statistically quantified, and thus, the number of potential simultaneous signals over a processor revisit time could determine the number of such "on-demand" digital signal processors required.

A processor would scan the raw data supplied to the matched filter and the initial time tag. The raw data is scanned at fractions of a chip rate using a separate matched filter as a co-processor to produce an auto-correlation in both the forward (in time) and backwards (in time) directions around the initial detection output for both the earliest (first observable path) detection and other buried signals. The output of the digital processor is the first path detection time, threshold information, and the amount of energy in the signal produced at each receiver's input, which is supplied to and processed by the time-of-arrival-based multi-lateration processor section 400.

Processor section 400 could use a standard multi-lateration algorithm that relies upon time-of-arrival inputs from at least three readers to compute the location of the tag transmitter. The algorithm may be one which uses a weighted average of the received signals. In addition to using the first observable signals to determine object location, the processor also can read any data read out of a memory for the tag transmitter and superimposed on the transmission. Object position and parameter data can be downloaded to a data base where object information is maintained. Any data stored in a tag memory may be augmented by altimetry data supplied from a relatively inexpensive, commercially available altimeter circuit. Further details of such circuit are found in the incorporated by reference '926 patent.

It is also possible to use an enhanced circuit as shown in the incorporated by reference '926 patent to reduce multi-path effects, by using dual antennae and providing spatial diversity-based mitigation of multipath signals. In such systems, the antennas are spaced apart from one another by a distance that is sufficient to minimize destructive multipath interference at both antennas simultaneously, and also ensure that the antennas are close enough to one another so as to not significantly affect the calculation of the location of the object by a downstream multi-lateration processor.

The multi-lateration algorithm executed by the location processor 26 could be modified to include a front end subroutine that selects the earlier-to-arrive outputs of each of the detectors as the value to be employed in a multi-lateration algorithm. A plurality of auxiliary "phased array" signal processing paths can be coupled to the antenna set (e.g., pair), in addition to any paths containing directly connected receivers and their associated first arrival detectors that feed the locator processor. Each respective auxiliary phased array path is configured to sum the energy received from the two antennas in a prescribed phase relationship, with the energy sum being coupled to associated units that feed a processor as a triangulation processor.

The purpose of a phased array modification is to address the situation in a multipath environment where a relatively "early" signal may be canceled by an equal and opposite signal arriving from a different direction. It is also possible to take advantage of an array factor of a plurality of antennas to provide a reasonable probability of effectively ignoring the destructively interfering energy. A phased array provides each site with the ability to differentiate between received signals, by using the "pattern" or spatial distribution of gain to receive one incoming signal and ignore the other.

The multi-lateration algorithm executed by the location processor 26 could include a front end subroutine that selects the earliest-to-arrive output of its input signal processing paths and those from each of the signal processing paths as the value to be employed in the multi-lateration algorithm (for that receiver site). The number of elements and paths, and the gain and the phase shift values (weighting coefficients) may vary depending upon the application.

It is also possible to partition and distribute the processing load by using a distributed data processing architecture as described in the incorporated by reference '976 patent. This architecture can be configured to distribute the workload over a plurality of interconnected information handling and processing subsystems. Distributing the processing load enables fault tolerance through dynamic reallocation.

The front end processing subsystem can be partitioned into a plurality of detection processors, so that data processing operations are distributed among sets of processors. The partitioned processors are coupled in turn through distributed association processors to multiple location processors. For tag detection capability, each reader could be equipped with a low cost omnidirectional antenna, that provides hemispherical coverage within the monitored environment.

A detection processor filters received energy to determine the earliest time-of-arrival energy received for a transmission, and thereby minimize multi-path effects on the eventually determined location of a tag transmitter. The detection processor demodulates and time stamps all received energy that is correlated to known spreading codes of the transmission, so as to associate a received location pulse with only one tag transmitter. It then assembles this information into a message packet and transmits the packet as a detection report over a communication framework to one of the partitioned set of association processors, and then de-allocates the detection report.

A detection processor to association control processor flow control mechanism equitably distributes the computational load among the available association processors, while assuring that all receptions of a single location pulse transmission, whether they come from one or multiple detection processors, are directed to the same association processor.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A location system comprising:
 a plurality of signal readers for receiving signals from a wireless transmitter to be located wherein each signal reader time-stamps a signal with a time-of-arrival time stamp, each one of said signals consisting of a wideband, spread spectrum signal as a location pulse consisting of identification data for an object to be located to which the wireless transmitter is attached and a timing marker appended a predetermined time in front of the location pulse for indicating the presence of the location pulse and wherein the timing marker is timed at a predetermined range in front of the location pulse corresponding to a predetermined propagation distance to establish a known period of time to aid in finding the location pulse wherein a sampling window for edge detection as a range gate is determined by the timing of the timing marker; and a location processor operatively coupled to said signal readers for processing the wideband, spread spectrum signal and responsive to a detection of the signal, correlating a signal as a first-to-arrive signal based on a time-of-arrival time stamp and conducting differentiation of first-to-arrive signals to locate the wireless transmitter.

2. A location system according to claim 1, wherein said timing marker is timed about 80 to about 120 nanoseconds in front of the wideband, spread spectrum signal.

3. A location system according to claim 1, wherein said timing marker is generated by a wireless local area network transmission.

4. A location system according to claim 3, and further comprising an access point base station operative with the location processor and at least one signal reader.

5. A location system according to claim 1, wherein said location processor comprises a matched filter correlator.

6. A location system according to claim 5, wherein said matched filter correlator further comprises matched filter banks having parallel correlators that correlate a received communications signal with time offset versions of a reference spreading code.

7. A location system according to claim 1, wherein said location processor further comprises a plurality of processors for distributing processing capability.

8. A location system according to claim 1, wherein three signal readers are used for determining the location of the wireless transmitter.

9. A location system according to claim 1, wherein each signal reader comprises a plurality of mutually diverse antennas for detecting signals at each signal reader.

10. A location system according to claim 1, wherein each wireless transmitter comprises a tag transmitter that is coupled with the object to be located.

* * * * *